United States Patent [19]

Hollifield

[11] Patent Number: 4,998,775
[45] Date of Patent: Mar. 12, 1991

[54] APPARATUS FOR PRECISION CUTTING OF CONCRETE SURFACES

[76] Inventor: David L. Hollifield, 2360 Wash Lever Rd., Chapin, S.C. 29036

[21] Appl. No.: 419,426

[22] Filed: Oct. 10, 1989

[51] Int. Cl.$^5$ .............................................. B28D 1/04
[52] U.S. Cl. ..................................... 299/39; 51/267; 125/14; 404/87
[58] Field of Search ...................... 299/38, 39; 404/87, 404/90; 83/928, 169; 125/12, 13 R, 14; 51/59 R, 74 R, 174, 177, 267, 268, 271, 272

[56] References Cited

U.S. PATENT DOCUMENTS

| | | | |
|---|---|---|---|
| 1,553,845 | 9/1925 | Bardol | 299/39 |
| 1,565,444 | 12/1925 | Hashim | 299/39 |
| 2,673,725 | 3/1954 | Coates | 299/39 |
| 2,736,311 | 2/1956 | Coates | 125/14 |
| 2,939,691 | 6/1960 | Lewis | 299/39 |
| 3,323,507 | 6/1967 | Schuman | 125/14 |
| 4,375,212 | 3/1983 | Santschi | 125/14 |
| 4,484,417 | 11/1984 | Klingerman | 51/267 |
| 4,557,245 | 12/1985 | Bieri | 125/14 |
| 4,840,431 | 6/1989 | Jedick | 299/39 |

Primary Examiner—Ramon S. Britts
Assistant Examiner—David J. Bagnell
Attorney, Agent, or Firm—Pollock, Vande Sande & Priddy

[57] ABSTRACT

A concrete cutting machine for making parallel precision linear cuts to repair a joint in a concrete floor. A self-propelled vehicle follows a linear track segment accurately positioned with respect to the path of a linear cut to be made in the concrete floor. A carriage supported by the vehicle is vertically positionable with respect to the floor and a table supported by the carriage is horizontally positionable with respect to the vehicle. A cutting blade and motor drive are supported by the table, permitting the blade to be accurately positioned relative to the joint. The cutting blade is enclosed within an enclosure, and may be immersed continuously in a recirculated coolant during cutting of the concrete floor.

23 Claims, 5 Drawing Sheets

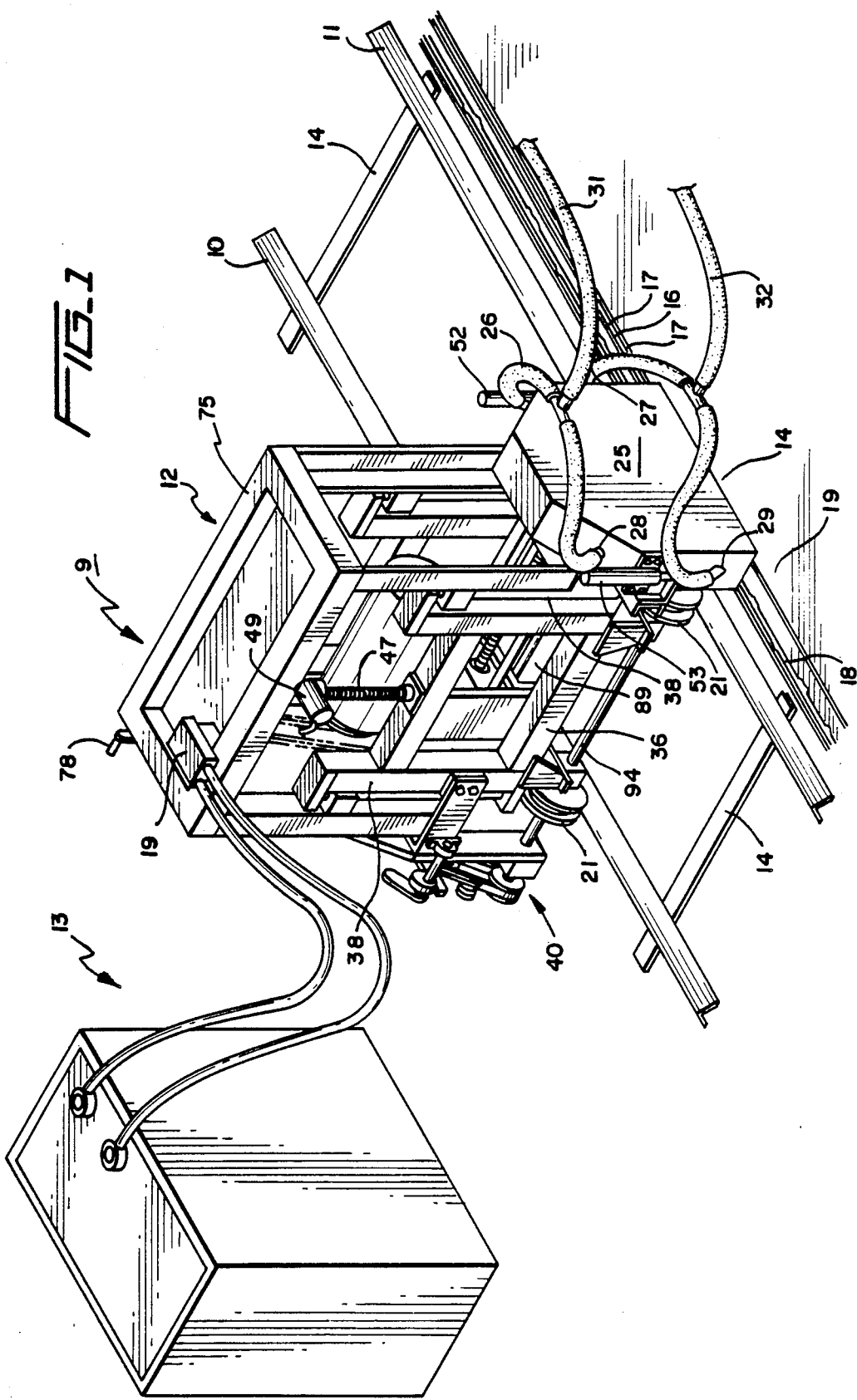

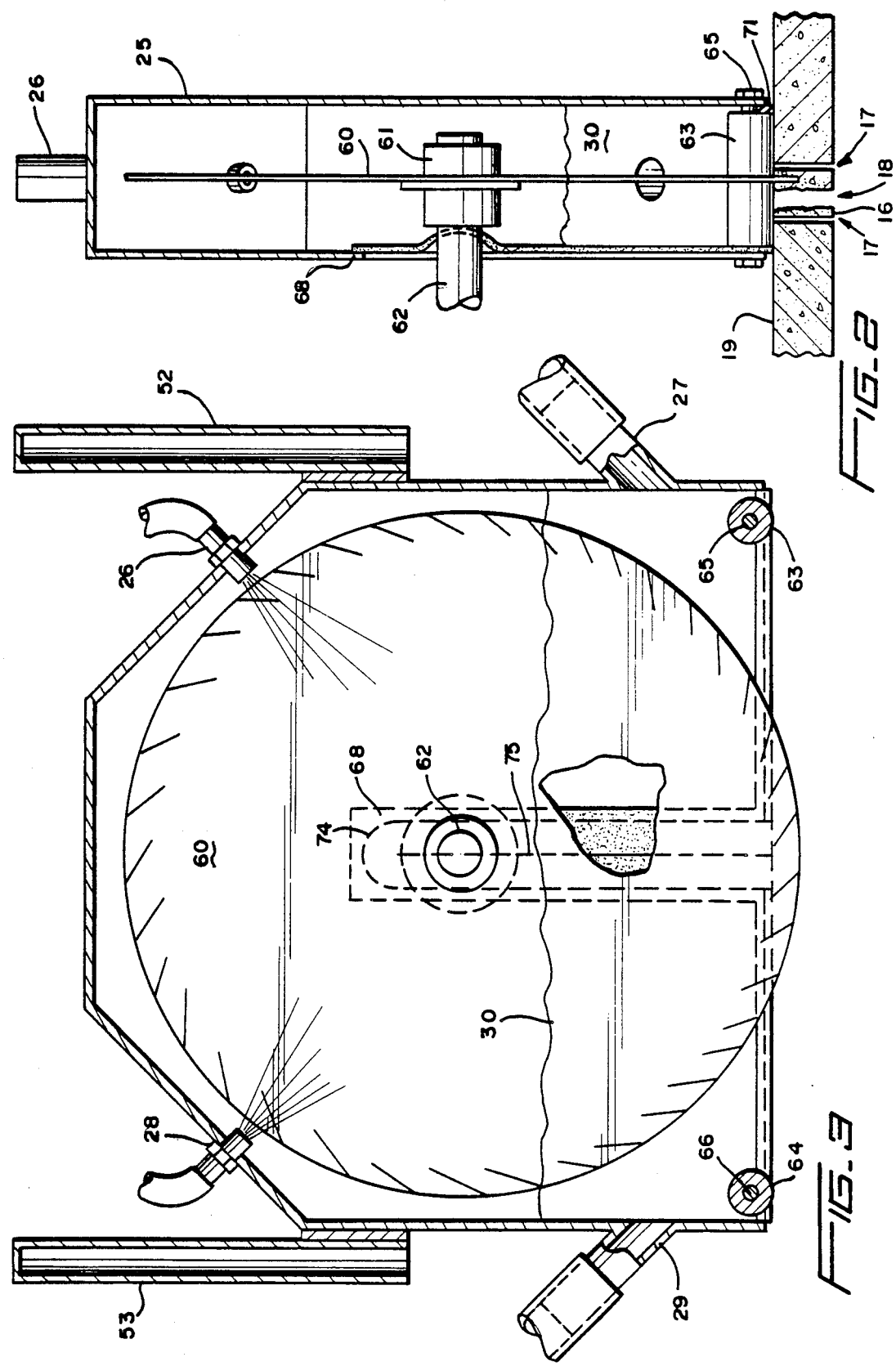

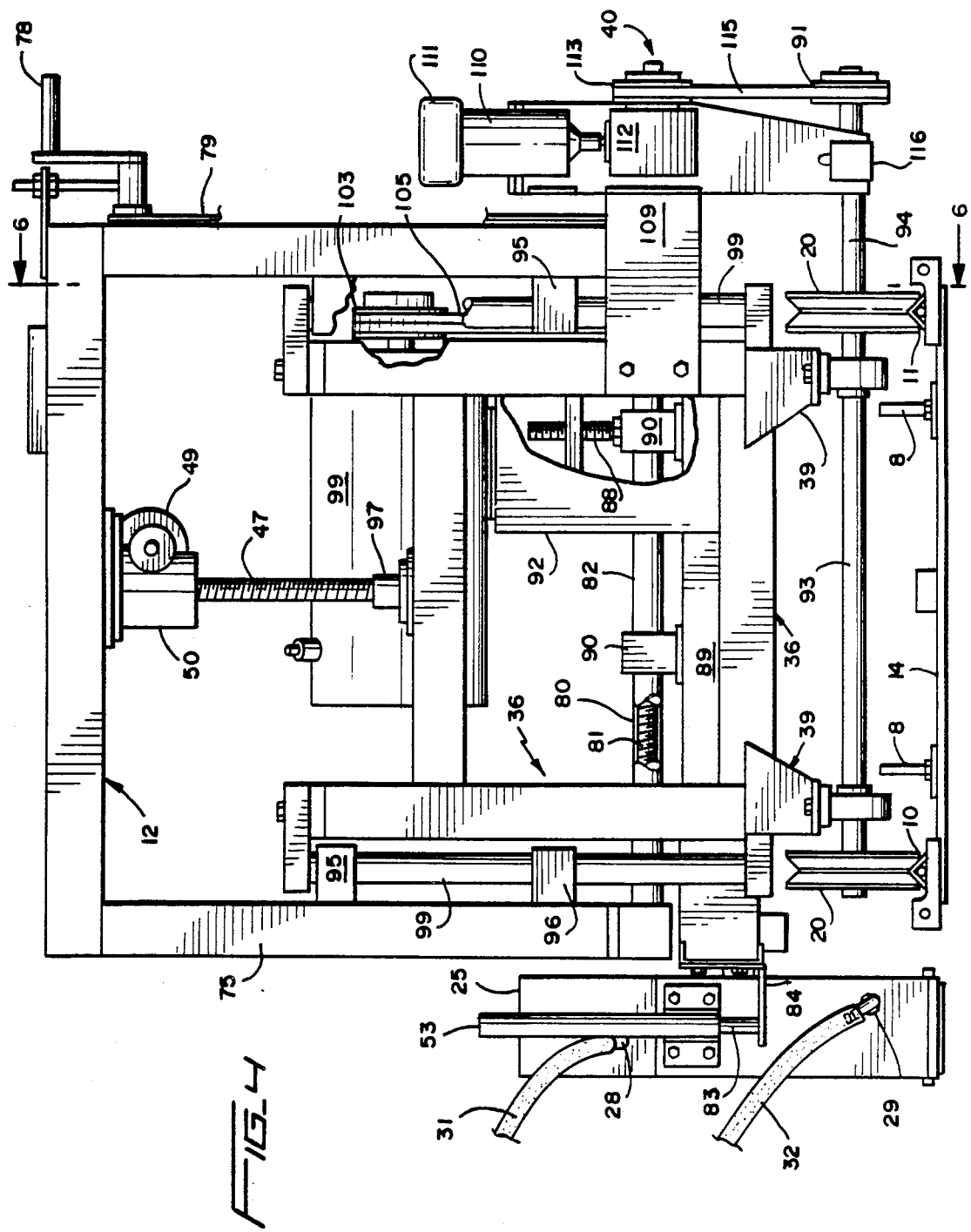

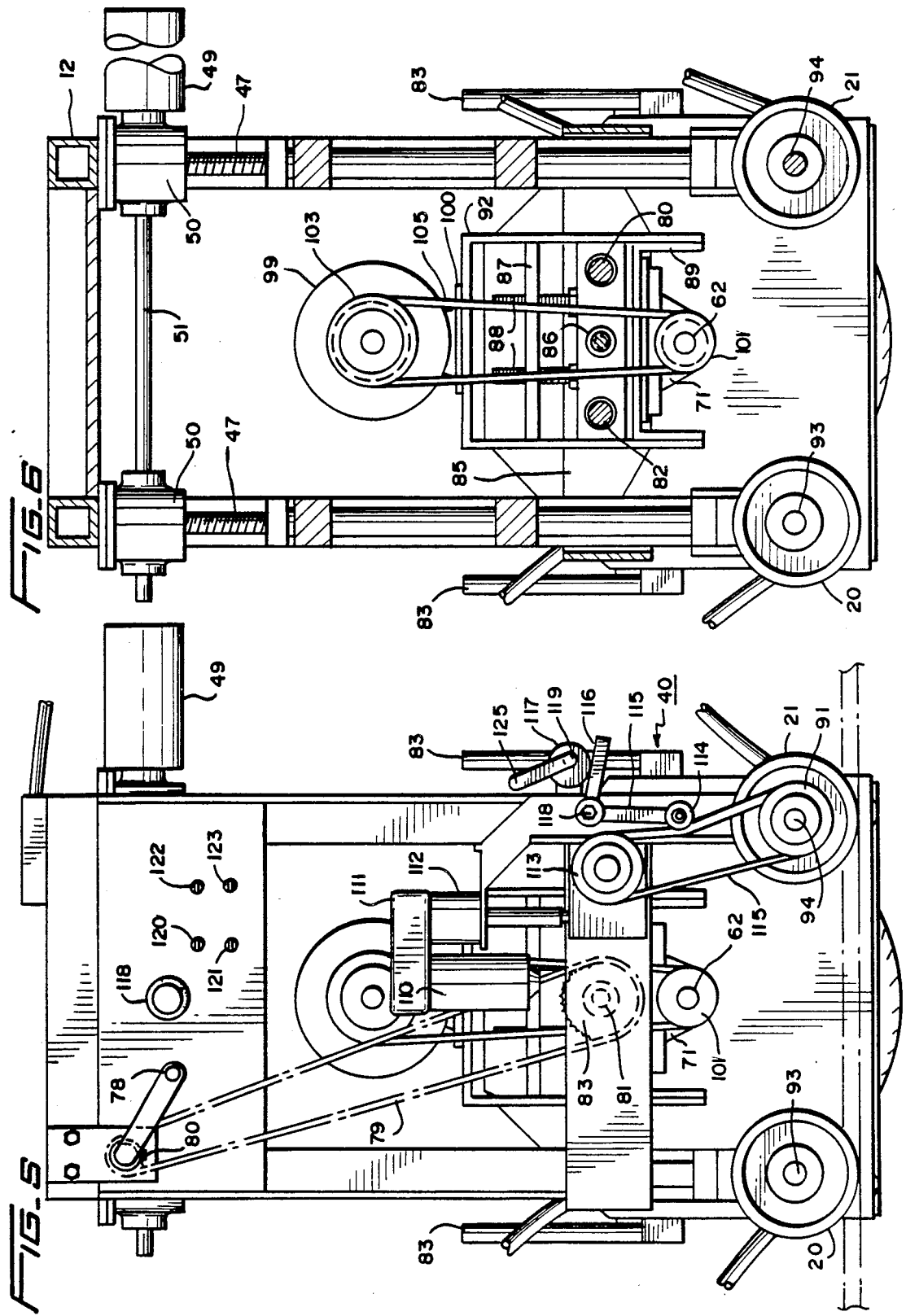

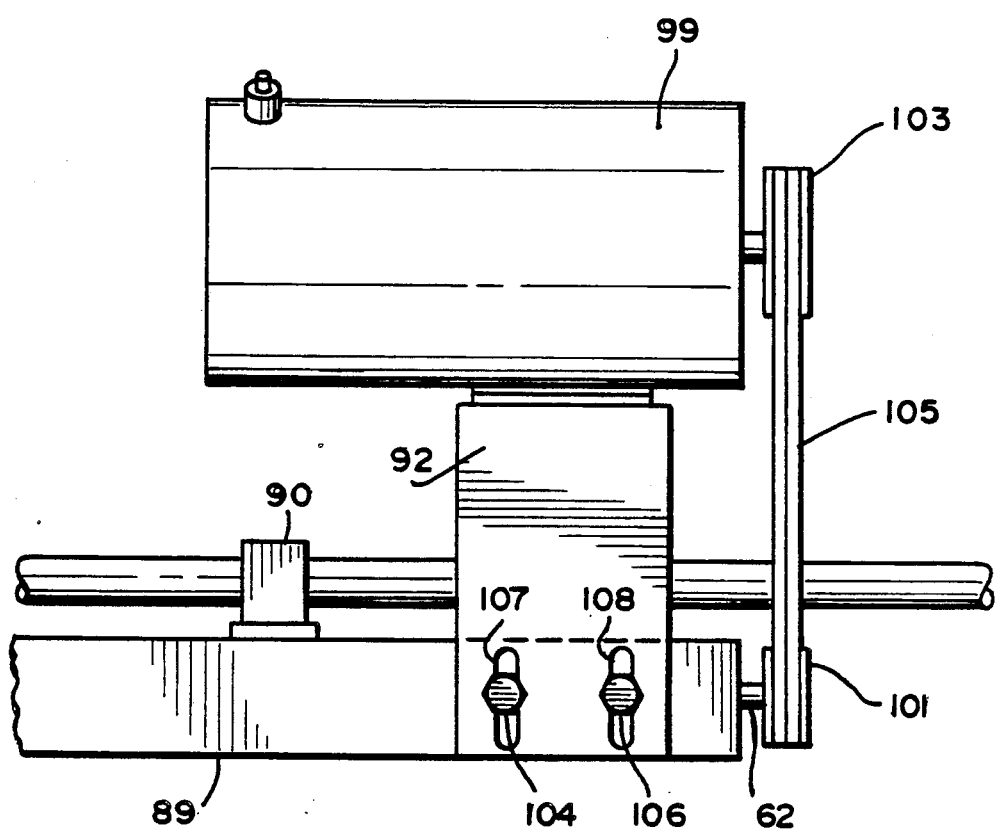
FIG_7

APPARATUS FOR PRECISION CUTTING OF CONCRETE SURFACES

TECHNICAL FIELD

The present invention relates to devices for cutting slots at a uniform depth in concrete surfaces. Specifically, a self-driven, battery-operated cutting apparatus is disclosed which will safely and accurately cut parallel slots in a concrete surface.

BACKGROUND OF THE INVENTION

Concrete floors in industrial buildings are formed, as is well known, by a plurality of slabs, each concrete slab being separated from an adjacent slab by an expansion joint. These expansion joints will permit the slabs to expand or contract without suffering any fractures due to differences in expansion rates in different portions of the concrete.

The strength of concrete floors makes them advantageous in industrial settings, such as warehouse use. Many tons of material may be stored in a warehouse without the floor suffering any damage from excessive weight. In order to efficiently handle the stored merchandise, it is necessary to use equipment which constantly rolls over the floor. The forklifts and other moving machinery will over time wear the edges of the expansion joints, thus making the expansion joint larger and the surface uneven. As the edges defining the expansion joint wear, a dangerous condition may result. Forklifts and other machinery driven over the surface of the concrete floor can be jarred, causing any cargo being transported to be dislodged and/or damaged, as well as posing a danger to the operator. Thus, from time to time such expansion joints are refinished by recutting the edges square, and filling the enlarged area with a suitable medium, such as an epoxy. The repair process envisions cutting a new expansion joint after the old worn one has been filled. The procedures used in the past for repairing concrete floors have been tedious, requiring a considerable amount of hand labor. As part of the process, part of the concrete surface must be cut away to provide a fresh square edge in the concrete. This process requires that long parallel slots be cut in the concrete surface adjacent to the old joint. The material between the slots is then broken out to form new opposing edges. The currently available apparatuses for cutting such long slots have several disadvantages.

One disadvantage is that no effective guiding is provided to permit a plurality of parallel slots to be cut accurately. By cutting accurately spaced parallel slots, it is possible to easily break away any material between the slots, thus forming an enlarged joint having the required square edges. Additionally, the refinishing of interior floors with equipment that is operated by a combustion engine releases dangerous pollutants into the air of confined spaces. Furthermore, the refinishing work is often done in an operating warehouse or other industrial facility, and only a limited work space is available, usually defined by aisles within the facility. Thus, it is important to be able to refinish the concrete joints within these aisles to as large an extent as possible, without requiring large-scale moving of stored merchandise or other materials within the facility.

The present invention has been devised to provide an economical solution for overcoming the foregoing difficulties in the repair of concrete floors.

SUMMARY OF THE INVENTION

It is therefore an object of the present invention to cut parallel slots for defining precision linear segments in a concrete surface. More specifically, this invention provides an apparatus which will cut parallel slots in a concrete surface, precisely positioned with respect to each other.

These and other objects are achieved by a concrete cutting machine in accordance with the present invention. The machine includes a self-driven vehicle which will follow a track, positioned to make a desired cut in a concrete surface. The vehicle includes a frame which is supported by wheels guided by a track accurately positioned with respect to a linear segment of concrete to be defined by two parallel cuts into the concrete surface, or by the edge of an existing joint and one cut parallel thereto.

A carriage is supported on the frame and is movable vertically by a first lead screw means. A table is supported by the carriage and is horizontally movable by a second lead screw means. A motor driven cutting head is supported by the table, and may be positioned both vertically and horizontally in directions perpendicular to the direction in which the vehicle moves. Thus, the motor-driven cutting head may be positioned from a vertical, non-cutting position into a lowered cutting position, thus cutting the concrete surface to a depth which is accurately controlled by the first lead screw means. Additionally, once a desired linear slot is cut in the concrete surface, the motor-driven cutting head may be positioned to cut a second, identical slot parallel to the first cut slot at a depth selected by the operator. These two parallel slots define therebetween an easily removable segment of the concrete slab.

In the preferred embodiment of the invention there is provided a housing for enclosing the cutting head, thereby protecting any personnel from debris or pieces of a saw blade which may be discharged from the cutting operation. The housing is supported by rollers for engaging the concrete surface, and defines an opening through which the cutting head moves as the housing floats vertically with respect to the vehicle. Thus, as the housing moves horizontally with the vehicle along the track, a slot in the housing for the drive shaft of the cutting head allows the housing to float up and down in accordance with the contour of the concrete surface being cut.

The housing of the preferred embodiment also receives a coolant through a pair of upper inlet ports for immersing the lower half of the cutting head. The coolant is recirculated through a pair of lower outlet ports to a source of circulated coolant.

The bottom edge of the housing, as well as the slot for the shaft driving the cutting head, is sealed against coolant leakage. Therefore, a relatively high percentage of the coolant is recirculated and reused during the cutting operation.

DESCRIPTION OF THE FIGURES

FIG. 1 is a perspective view of the vehicle in accordance with the preferred embodiment.

FIG. 2 is a side sectional view of the cutting head housing.

FIG. 3 is a front sectional view of the cutting head housing.

FIG. 4 is a side elevational view with fragmentary sections illustrating the horizontal table as supported for vertical and horizontal movement with respect to the vehicle frame.

FIG. 5 is a rear elevational view illustrating the drive train for the vehicle.

FIG. 6 is a rear elevational view in section illustrating the cutting head drive motor supported by the horizontal table.

FIG. 7 is a fragmentary sideview showing the motor support on the horizontal table.

DESCRIPTION OF THE PREFERRED EMBODIMENT

Referring now to FIG. 1, there is shown a preferred embodiment of the concrete cutting machine. The concrete cutting machine comprises a self-powered vehicle 9, supported on a pair of tracks 10 and 11. The tracks are shown as angle pieces, connected together by perpendicular braces 14. The tracks 10 and 11 are parallel to each other, and are positioned parallel to a linear expansion joint 18 in a concrete floor 19. The vehicle frame 36 carries a vertically movable carriage 12, which in turn supports a horizontally movable table 89.

The self-powered vehicle 9 has a narrow profile, supporting at one end thereof a cutting head 60 within an enclosure 25. The enclosure 25 is open at the bottom edge thereof and floats on floor 19 via two rollers 63 and 64 and two cylindrical tubular supports 52 and 53 which slidably receive two posts 83, 83 connected to the horizontal movable table 89. The supported cutting head 60 within enclosure 25 may be vertically positioned by virtue of a motor 49, driving a pair of lead screws 47, 47. Lead screws 47, 47 have one end connected to vehicle frame 36 and the other end connected to the carriage 12. By advancing the lead screws 47, 47, the carriage 12 can be positioned vertically with respect to the vehicle frame 36. Thus, the cutting head, which is a circular saw blade in the preferred embodiment, may be vertically positioned within the housing 25, and relative to the floor 19.

The carriage 12 supports a table 89 which may be moved horizontally with respect to the vehicle frame 36 by rotating a hand crank 78. The hand crank 78 is coupled to a horizontally disposed lead screw 81, and as will be evident from other figures, imparts a horizontal movement to the cutting head 60 supported on the table 89 by its drive shaft 62. The vehicle frame 36 is supported by first and second axles 93 and 94 each having a pair of wheels 20, 20 and 21, 21, respectively, which engage the tracks 10 and 11.

The vehicle is self-powered by a motor 110 through a drive train 40 coupled to axle 94 which extends rearwardly of axle 93 as seen best in FIG. 4. The vehicle is capable of being run in first and second opposite directions. The profile of the vehicle in the cutting direction is maintained at substantially the width of the cutting head to permit cutting of a concrete floor as far as the tracks 10 and 11 will extend, and as close as possible to the walls or other structures which bound the ends of the expansion joint requiring repair.

The vehicle is powered by a portable DC battery pack 13 which is connected through a connector 19 to an electrical circuit (not shown) carried by the vehicle for operating the motors 49, 99 and 110, thus avoiding the emission of toxic fumes causing environmental and health concerns. Battery pack 13 may comprise three 12-volt batteries connected in series to provide a 36-volt DC power source.

Connected to the housing 25 is a source of recirculated coolant. Coolant is supplied through conduit 31 to first and second inlet nozzles 26 and 28. The coolant 30 collects within the lower portion of enclosure 25 and can be recirculated through the outlet ports 27 and 29 via conduit 32. The cutting head is therefore safely enclosed, preventing any accidental discharge of abrasive or cut concrete which may result in injury. The cutting efficiency is also improved and wear reduced through use of the partially submerged and cooled cutting head. In addition, the recirculation provided substantially reduces the amount of water or other liquid consumed for cooling of the cutting head and lubrication of the cutting action.

FIGS. 2 and 3 illustrate sectional views of the housing 25 for enclosing the cutting head 60. The cutting head comprises a circular blade connected by a hub 61 to a drive shaft 62, extending from a drive pulley 101 at the rear of the movable table 89. The cutting head is shown partially immersed in a coolant 30. First and second rollers 63 and 64 are located at the leading and trailing edges of the housing 25. The rollers are supported for rotation by pins 65 and 66, respectively, mounted on the housing, permitting rolling of the housing over the concrete surface in the direction of vehicle movement. The housing 25 is sealed at the lower edge by seals 68 and 71. Seals 68 and 71 substantially seal the open end of housing 25 against leakage of the coolant 30 from between the housing 25 and the surface of floor 19, while the machine is traversing the concrete surface. The seal 68 also maintains the slot 74 substantially sealed against leakage, permitting coolant 30 to collect within the housing 25. The shaft 62 supporting the blade 60 is permitted to move vertically within the slot 74 by a vertical slit 75 in seal 68 to permit the blade to be moved into and out of cutting position. With seals 68 and 71 in place and in good condition, the major portion of coolant lost is due to leakage through joint 18 and the parallel slots, such as 17, 17, formed by the cutting action.

As FIG. 2 illustrates, by using the horizontal and vertical lead screw assemblies, it is possible to accurately position the blade 60 with respect to slots being cut in the concrete surface. Blade 60 can make a series of parallel cuts, permitting the material in segments 16 between parallel cuts 17, 17 to be broken out with simple hand tools. The joint 18 may then be repaired by filling its widened transverse cross-section with a suitable epoxy composition, and then recutting the expansion joint. Those familiar with the process of repairing these types of joints will recognize the importance of maintaining the cuts parallel as well as straight. In many situations, a metal liner is placed adjacent to the cut edges in the newly cut channel, where it is held in place with an adhesive. If the edges of the channel are not straight, installing such liners is very difficult.

Housing 25 is floatingly supported on the horizontal table 89 by means of the two upstanding tubular supports 52, 53. These supports 52, 53 ride vertically on the pair of posts 83, 83 as shown in FIG. 4. The housing is free to move vertically, but is positionable horizontally along two directions by table 89 and frame 36, respectively. The blade 60, connected by hub 61 to motor shaft 62, may be positioned vertically within housing 25 by carriage 12. Slot 74 permits this relative vertical movement between shaft 62 and housing 25.

FIG. 4 is a side elevational view of the concrete cutting machine in accordance with the preferred embodiment. The self-propelled vehicle 9 supports the vertically movable carriage 12 comprising a rectangular frame 75. Each vertical side of the rectangular frame 75 is supported by a pair of guides 95 and 96 slidably receiving a corresponding vertical rail 99 connected to an adjacent column 38 of the vehicle frame 36. The guides 95, 96 permit vertical movement of the carriage frame 75 along the four rails 99.

The vehicle frame 36 includes a pair of axle supports 39, 39 for each of the axles 93, 94 of the vehicle. The axle supports 39, 39 are conventional roller bearing supports, which mount the axles on the frame 36. The axles 93 and 94 have respective pairs of wheels 20, 20 and 21, 21 connected thereto.

Vertical movement of the carriage 12 with respect to the vehicle frame 36 is accomplished by the pair of lead screws 47, 47. The lead screws 47, 47 are connected at one end to a drive mechanism 50 which, in turn, is driven by the driving shaft of a motor 49. The lead screws 47, 47 when rotated, displace the carriage 12 relative to the frame 36. The other end of each lead screw terminates in a support 97, thus coupling the carriage 12 to the vehicle frame 36.

In a similar manner, the horizontal table 89 is supported by the carriage 12 via first and second rails 80, 82. The rails 80, 82 terminate in mountings at cross-members 85 between the vertical sides of the carriage frame 75, and support the horizontal table 89 through a pair of guide blocks 90, 90 connected to the table. Rotation of a lead screw 81 horizontally displaces the table 89 in a forward and aft direction with respect to carriage 12 by engaging threaded apertures 86 in blocks 90, 90. A hand crank 78 has a chain 79 coupled by a pair of sprockets to one end of the lead screw 81 for causing its rotation. The other end of lead screw 81 is rotatably captivated in the forward cross-member 85 between the carriage vertical sides.

Supported at the forward end of the table 89 via a pair of brackets 84 and upstanding posts 83, 83 is the housing 25. The housing 25 includes the aforementioned tubular supports 52 and 53, which maintain the housing 25 horizontally fixed with respect to horizontal table 89, but free to move vertically as the contour of the concrete surface supporting the rollers 64 and 65 of housing 25 changes. Additionally, it can be seen that when the carriage 12 is raised vertically by a sufficient amount, the tubular supports 52 and 53 will bottom out on the brackets 84, permitting the housing 25 to be moved vertically by the brackets relative to the concrete floor.

Supported by the horizontal table 89 is a motor bracket 92.

The motor bracket 92 supports the motor 99 which may be a 36-volt DC 4 hp motor. The motor assembly includes a pulley 103 at one end for driving a belt 105 which in turn drives a pulley 101 to rotate the saw blade shaft 62. Tensioning of the belt 105 may be accomplished through a pair of tensioning bolts 88, 88 which move the motor bracket 92 vertically relative to table 89, thereby tensioning the belt 105. The desired tensioning of belt 105 is fixed by tightening bolts 104 and 106 in slots 107 and 108 of bracket 92 as shown in FIG. 7.

The drive train 40 is connected to the vehicle frame 36 via a bracket 109. The drive train 40 includes a second motor 110 which may also be a 36-volt DC motor. The motor is in turn coupled to a transmission 111 which drives a 90 takeoff 112. The 90° takeoff 112 includes a pulley 113 for driving a belt 115. The belt 115 is coupled to the pulley 91 which is connected to driving axle 94. The motor 110, when energized, will impart motion to the axle 94, thus moving the vehicle 9 down the tracks 10 and 11.

Referring now to FIG. 6, a sectional rear end view of the vehicle shows in particular the support of the table 89 on the rails 80 and 82. The table 89 has on the underside thereof a journal 71 for rotatably mounting the saw drive shaft 62. The drive pulley 101 is coupled to the saw drive shaft 62. The motor 99 is coupled to pulley 101 via belt 105 around pulley 103, and thus provides the saw blade 60 with rotational power.

The motor 99 has a base 100 which may be positioned horizontally through bolts and mounting slots (not shown) on the top of the motor bracket 92. Vertical tensioning of the drive belt 105 is accomplished through the pair of tensioning bolts 88, 88. The tensioning bolts 88, 88 have corresponding heads supported on the surface of the table 89 by the rear guide block 90. The motor support includes a lateral member 87, having threaded holes which receive each of the tensioning bolts 88. The bracket 92 is also provided with pairs of slots 107 and 108 on its opposite lateral sides, one slot of each pair being shown in FIG. 7. Slots 107 and 108 permit movement of the two pairs of mounting bolts 104 and 106 relative to the bracket 92. When these bolts are loosened, the tensioning bolts 88, 88 may be adjusted to move the entire bracket 92 vertically with respect to the table 89, thereby tensioning the drive belt 105. When the belt is properly tensioned, bolts 104, 106 are tightened to fix bracket 92 relative to table 89. As FIG. 6 illustrates, the drive assembly for moving the carriage 12 vertically comprises a pair of lead screws 47, 47 and corresponding driving mechanisms 50, 50 for lifting the entire carriage 12 with the force provided through a drive shaft 51 by motor 49, which may be mounted as shown in FIG. 6 or may be mounted inside of frame 12 and connected to shaft 51 by a chain and sprocket (not shown). FIG. 5 is another view of the vehicle, illustrating the electrical controls 118, 120, 121, 122 and 123. The hand crank 78 is also shown, with a corresponding chain sprocket 80 driving the chain 79 about a corresponding chain sprocket 83, which is coupled to the lead screw 81 of the horizontal table 89. Optionally, hand crank 78 may be replaced by a variable speed motor and potentiometer control similar to motor 110 and potentiometer 118 described below as part of the vehicle drive means.

There is also shown in FIG. 5 a tensioning pulley 114, associated with the drive train 40. The tensioning pulley 114 may be manually adjusted to supply a given amount of tension to the drive belt 115. The tensioning pulley 114 is carried bY a link arm 115 connected to the frame 36 to pivot about a fulcrum pin 118. PulleY 114 is positioned by a cam member 117 supported for rotation about a shaft 119 and for engaging a lever arm 116 rigidly connected to link arm 115. A lever 125 is connected to shaft 119 for adjusting cam 117 relative to lever arm 116 to position pulley 114 for providing the desired amount of tension in belt 115. Once belt 115 is properly tensioned, the shaft 119 may be locked in place by conventional means. This tensioning feature will provide torque limiting action to the vehicle drive train in the face of an obstacle which the vehicle on the cutting head may encounter during its travel. If an individual or an article impedes the forward progress of the vehicle or the cutting head, the belt 115 will begin to slip and the machine will not impart a moving force to the obstacle which might damage the vehicle or the cutting head. The individual operator can establish a safe amount of driving torque by the manual adjustment of the tensioning pulley 114, as previously described.

Also shown in FIG. 5 is the wheel 20 belonging to the axle 93. This axle 93 supports a second pair of wheels 20, 20 which freely rotate, or preferably are driven from axis 94 by a sprocket and chain drive (not shown).

The cutting machine has a variable speed along its tracks as set by the potentiometer 118. Potentiometer 118 will establish the current for the drive motor 110, thus permitting the operator to establish a desired cutting speed for the vehicle.

A toggle switch 120 will turn the power to the driving motor 110 on and off. A switch 121 will reverse the direction of travel of the vehicle by switching the polarity of the voltage supplied to the motor 110.

A third switch 122 controls the motor 49, thus permitting the carriage 12 to be raised when the three-position switch is in one position, lowered when in another position and deenergized when in the middle, third position. An on-off switch 123 enables and disables power to the saw motor 99.

It is therefore clear that the concrete cutting apparatus shown is capable of accurately cutting parallel linear slots in a concrete surface. The speed and depth of cut are completely controllable by the operator using the electrical controls provided. The apparatus may also be operated in complete safety since it is totally electric and does not pose any health or environmental hazards to operating personnel.

The cutting machine 9 also may be fastened to a section of track as by one or more detachable clamps (not shown) which may extend from anchors 8, 8 on cross-braces 14 to overlying members of frame 36, for storage and/or movement on a truck or other carrier to a work site. The section of track fastened to the vehicle 9 also may be bolted to a palette for permitting a forklift or other mobile equipment to move the cutting machine to a truck bed for transportation.

A machine having great utility for cutting slots in concrete floors has therefore been disclosed, and will be defined in more detail by the claims which follow.

What is claimed is:

1. A concrete cutting apparatus for repairing joints between slabs of a concrete floor, said apparatus comprising:

track means extending along a first direction parallel to one of said joints;

a vehicle for riding along said track means, said vehicle including frame means supported and guided by said track means in said first direction;

carriage means supported by said frame means and vertically positionable by a first drive means;

table means supported by said carriage means and horizontally movable in a second direction perpendicular to said first direction by a second drive means;

cutting means supported by said table means for making a plurality of substantially parallel and linear cuts in at least one of said concrete slabs when said vehicle travels along said track means with said carriage means in a vertically lowered position, said linear cuts being spaced apart from each other and parallel to said floor joint at positions established by said second drive means, and said cutting means comprising a motor for driving a shaft supporting a rotary saw blade in a plane substantially parallel to said first direction;

an enclosure for enclosing at least a portion of said saw blade, said enclosure having a bottom edge forming an opening adjacent to a surface of said concrete floor when said surface is being cut by said saw blade; and, coolant means for supplying an inflow of coolant to said enclosure and for providing an outflow of coolant from said enclosure so that the amount of said inflow relative to said outflow is such that a substantial portion of said saw blade may be immersed in coolant during cutting of said concrete.

2. The concrete cutting machine of claim 1 wherein said vehicle includes motor means for propelling said vehicle along said tracks during cutting of said concrete.

3. The concrete cutting apparatus of claim 2 wherein said motor means includes torque limiting means for stopping the propelling of said vehicle along said track means when said cutting means encounters a non-cuttable object in its path.

4. The concrete cutting apparatus of claim 1 wherein said first drive means comprises a motor connected to a first lead screw for moving said carriage means so as to position said cutting means vertically.

5. The concrete cutting apparatus of claim 1 wherein said coolant means comprises recirculating means for returning at least a portion of said coolant outflow back to said enclosure.

6. The concrete cutting apparatus of claim 5 further comprising seal means extending around at least a major part of said bottom enclosure opening to reduce by a substantial amount the leakage of coolant that would occur without said seal means.

7. The concrete cutting apparatus of claim 6 wherein said enclosure includes a slot for movement of said saw blade shaft relative to said enclosure, and wherein said apparatus further includes seal means along the edges of said slot to reduce by a substantial amount the leakage of coolant that would occur without said seal means.

8. A concrete cutting machine for repairing joints between slabs of a concrete floor, said machine comprising:

a vehicle having means for engaging a track means to guide said vehicle along a path extending parallel to one of said joints;

a motor-driven cutting blade;

carriage means supported by said vehicle for moving said motor-driven cutting blade in a vertical direction;

table means supported by said vehicle for moving said motor-driven cutting blade in a horizontal direction perpendicular to said joint, said movements permitting said cutting blade to be positioned into and out of different cutting positions each parallel to said joint; and, shroud means comprising an enclosure for enclosing a part of said blade when said part is above the surface of said concrete floor while said floor is being cut by said blade, and means for attaching said enclosure to said vehicle for moving said enclosure along the direction of said vehicle path, said enclosure having roller means at a bottom edge thereof for permitting rolling movement of said enclosure over said concrete surface, and said attaching means permitting said enclosure to move vertically for following the contour of said concrete surface.

9. The concrete cutting machine of claim 8 further comprising coolant means for supplying an inflow of coolant to and for providing an outflow of coolant from said enclosure to cool said cutting blade during a cutting operation.

10. The concrete cutting machine of claim 9 wherein said coolant means includes at least one inlet and at least one outlet, pump means connected to said inlet and said outlet for recirculating at least a portion of the coolant within said enclosure, and a flexible sealing means for providing a substantial liquid seal between the bottom edge of said enclosure and the surface of said concrete floor.

11. The concrete cutting machine of claim 9 and wherein said coolant means includes inlet means connected to said enclosure at an upper portion thereof near a top portion of said blade, and outlet means connected to said enclosure at a portion thereof near said concrete surface.

12. The concrete cutting machine of claim 11 wherein said inlet means includes first and second inlet nozzles provided on said enclosure forwardly and rearwardly, respectively, of said blade; and wherein said outlet means includes first and second outlet ports provided on said enclosure forwardly and rearwardly, respectively, of said blade.

13. The concrete cutting machine of claim 9 wherein said carriage means includes a motor for moving said carriage to change the vertical position of said cutting blade, and wherein said coolant means comprises recirculating means for returning at least a portion of said coolant outflow back to said enclosure.

14. The concrete cutting machine of claim 8 wherein said enclosure has an opening along a bottom edge thereof, and wherein said shroud means further comprises means for exposing through said opening a bottom portion of said blade corresponding to the depth of a cut being made in said concrete floor.

15. The concrete cutting machine of claim 8 wherein said vehicle is self-propelled and comprises motor means for propelling said vehicle along said tracks during cutting of said concrete.

16. A concrete cutting apparatus comprising:
   track means extending along a path parallel to a joint between slabs of a concrete floor;
   a vehicle frame supported by wheel means having wheels which are guided along said path by said track means;
   a carriage carried by said vehicle frame for vertical movement;
   a platform carried by said carriage for horizontal movement perpendicular to said path;
   a rotary saw connected to a motor by a drive shaft and supported on said platform with a rotary blade in a plane parallel to said path, said rotary blade being positionable vertically by said carriage to cut said concrete floor to a predetermined depth and being positionable horizontally by said platform to cut said concrete floor at a plurality of different lateral positions with respect to said joint;
   enclosure means for enclosing said rotary blade, said enclosure means including an enclosure having a bottom opening and a vertical slot on one side thereof for permitting said shaft of said rotary saw to move vertically relative to said enclosure, said bottom opening of said enclosure being adjacent to the surface of said concrete floor while said floor is being cut by said blade;
   means for supporting said enclosure for movement with said vehicle frame along the direction of said path and for permitting said enclosure to move vertically relative to said vehicle frame; and,
   coolant means for supplying coolant to and recirculating coolant from said enclosure to cool said rotary blade during cutting of said concrete; said enclosure means further comprising an inlet means and an outlet means connected to said coolant means, and sealing means for maintaining said vertical slot substantially sealed against leakage of said coolant through said slot and for maintaining the edge of said bottom opening substantially sealed against said concrete surface, said sealing actions being sufficient to provide a level of coolant in said enclosure.

17. The concrete cutting apparatus of claim 16 further comprising a motor transmission means coupled to at least one of said wheels for moving said vehicle frame along said track means.

18. The concrete cutting apparatus of claim 17 wherein said motor transmission means includes a torque limiting means to stop said vehicle frame from moving along said track means when said rotary blade encounters a non-cuttable object in its path.

19. The concrete cutting apparatus of claim 16 wherein said enclosure means further comprises a pair of rollers one adjacent to the front edge and the other adjacent to the rear edge of said enclosure opening for facilitating movement of said enclosure over the surface of said concrete floor along a direction parallel to said path.

20. A concrete cutting apparatus for repairing joints between slabs of a concrete floor, said apparatus comprising:
   track means extending along a first direction parallel to one of said joints;
   a vehicle for riding along said track means, said vehicle including frame means supported and guided by said track means in said first direction and motor means for propelling said vehicle along said tracks during cutting of said concrete, said motor means comprising torque limiting means for stopping the propelling of said vehicle along said track means when said cutting means encounters a non-cuttable object in its path;
   carriage means supported by said frame means and vertically positionable by a first drive means;
   table means supported by said carriage means and horizontally movable in a second direction perpendicular to said first direction by a second drive means; and,
   cutting means supported by said table means for making a plurality of substantially parallel and linear cuts in at least one of said concrete slabs when said vehicle travels along said track means with said carriage means in a vertically lowered position, said linear cuts being spaced apart from each other and parallel to said floor joint at positions established by said second drive means.

21. A concrete cutting machine for repairing joints between slabs of a concrete floor, said machine comprising:
   a vehicle having means for engaging a track means to guide said vehicle along a path extending parallel to one of said joints;

a motor-driven cutting blade;

carriage means supported by said vehicle for moving said motor-driven cutting blade in a vertical direction;

table means supported by said vehicle for moving said motor-driven cutting blade in a horizontal direction perpendicular to said joint, said movements permitting said cutting blade to be positioned into and out of different cutting positions each parallel to said joint;

shroud means comprising an enclosure for enclosing a part of said blade when said part is above the surface of said concrete floor while said floor is being cut by said blade; and, coolant means for supplying coolant to and removing coolant from said shroud means to cool said cutting blade during a cutting operation, said coolant means including inlet means connected to said enclosure at an upper position thereof near a top portion of said blade, and outlet means connected to said enclosure at a position thereof near said concrete surface.

22. The concrete cutting machine of claim 21 wherein said coolant means comprises recirculating means for returning at least a portion of said removed coolant back to said enclosure.

23. The concrete cutting machine of claim 21 wherein said vehicle is self-propelled and comprises motor means for propelling said vehicle along said tracks during cutting of said concrete.

* * * * *